Oct. 13, 1953  A. W. PAYNE  2,655,193
APPARATUS FOR BENDING TUBING INTO SERPENTINE FORM
Filed April 23, 1951  7 Sheets-Sheet 1

INVENTOR.
Arthur W. Payne
BY
Barnes, Kisselle, Laughlin & Raisch
ATTORNEYS.

Oct. 13, 1953　　　A. W. PAYNE　　　2,655,193
APPARATUS FOR BENDING TUBING INTO SERPENTINE FORM
Filed April 23, 1951　　　　　　　　　　　　7 Sheets-Sheet 2
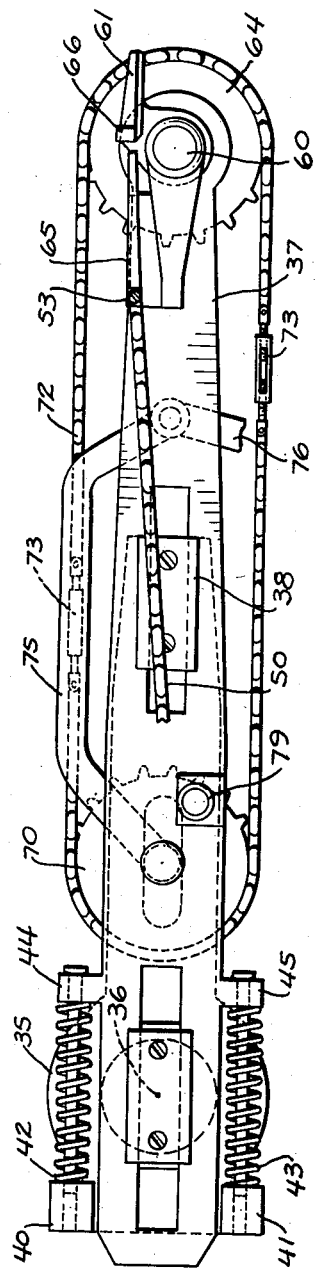
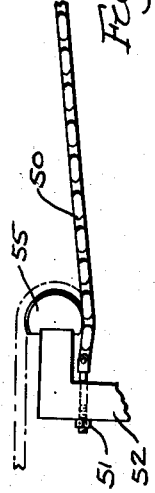
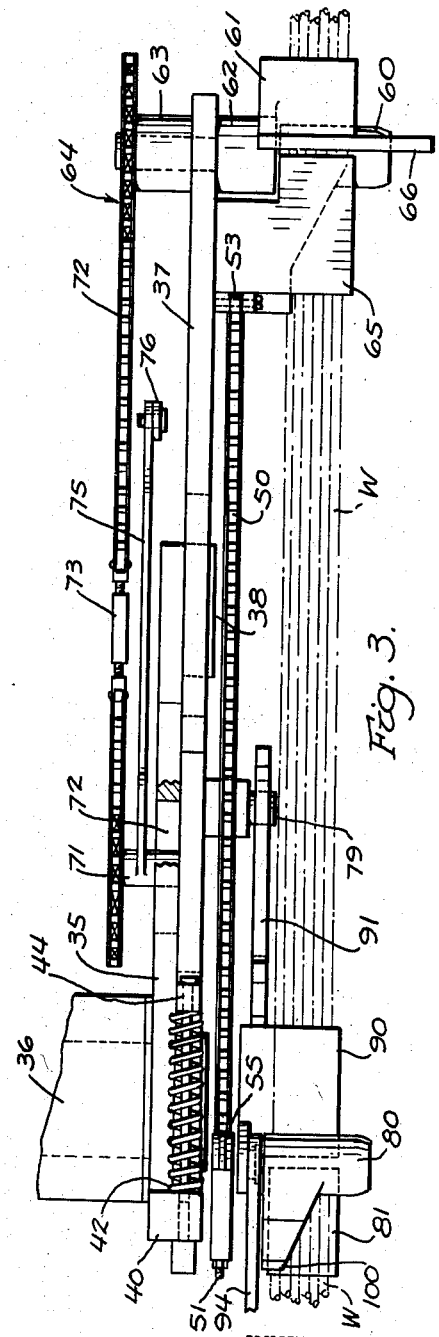
INVENTOR.
Arthur W. Payne
BY
Barnes, Kisselle, Laughlin & Raisch
ATTORNEYS.

Oct. 13, 1953     A. W. PAYNE     2,655,193
APPARATUS FOR BENDING TUBING INTO SERPENTINE FORM
Filed April 23, 1951     7 Sheets-Sheet 3

INVENTOR.
Arthur W. Payne
BY
ATTORNEYS.

Oct. 13, 1953   A. W. PAYNE   2,655,193
APPARATUS FOR BENDING TUBING INTO SERPENTINE FORM
Filed April 23, 1951   7 Sheets-Sheet 4

INVENTOR.
Arthur W. Payne
BY Barnes, Kisselle, Laughlin & Raisch
ATTORNEYS.

INVENTOR.
Arthur W. Payne

ATTORNEYS.

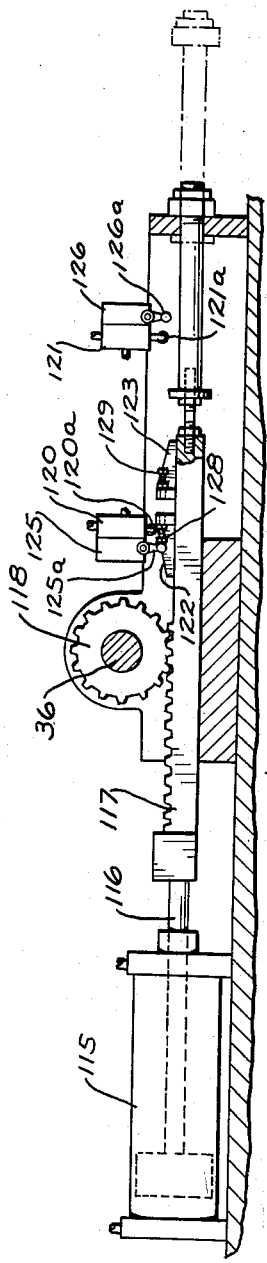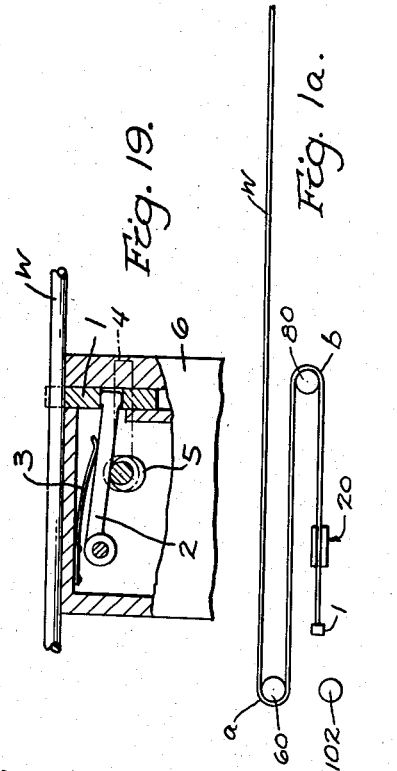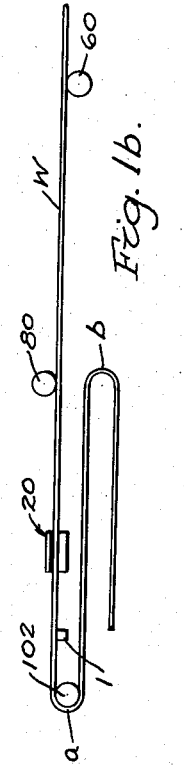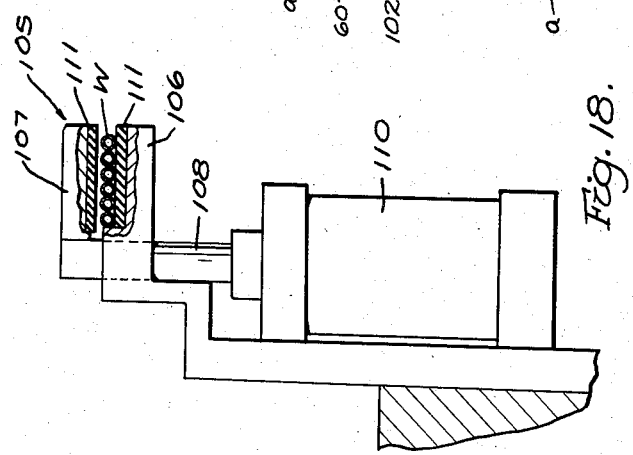

Oct. 13, 1953 A. W. PAYNE 2,655,193
APPARATUS FOR BENDING TUBING INTO SERPENTINE FORM
Filed April 23, 1951 7 Sheets-Sheet 7
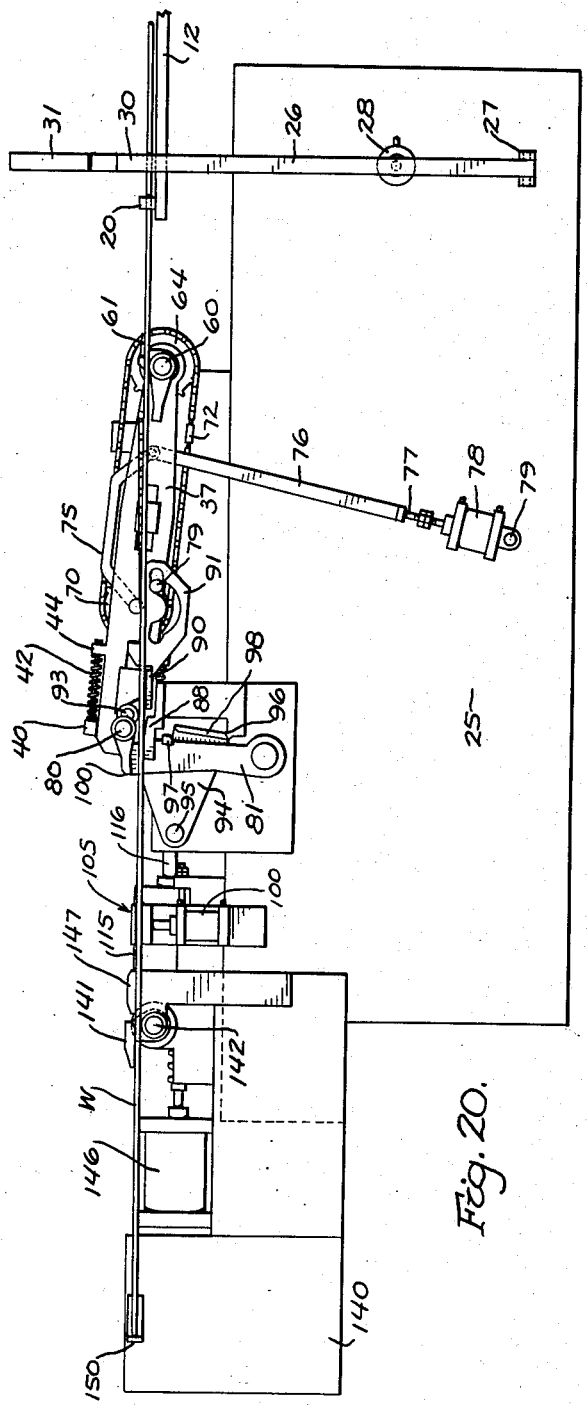
INVENTOR.
Arthur W. Payne
BY
Barnes, Kisselle, Laughlin & Raisch
ATTORNEYS.

Patented Oct. 13, 1953

2,655,193

UNITED STATES PATENT OFFICE 2,655,193

APPARATUS FOR BENDING TUBING INTO SERPENTINE FORM

Arthur W. Payne, Detroit, Mich., assignor to Bundy Tubing Company, Detroit, Mich., a corporation of Michigan Application April 23, 1951, Serial No. 222,312

22 Claims. (Cl. 153—40)

This invention relates to an apparatus for fashioning long work pieces into serpentine form. The apparatus is particularly useful for fashioning tubing although other long work pieces could be similarly fashioned, such for example, as wire or rods.

For purposes of brevity, the apparatus will be referred to herein as one for bending tubing and the work pieces will be referred to as tubing.

The bending of long lengths of tubing into serpentine form involves a number of difficult problems which have to do with the accurate formation of the tubing, the maintenance of the accurate form after the accurate form has been attained, the shaping of the tubing with adequate speed and facility, so that the procedure is commercially feasible, and the attaining of a procedure which will minimize wastefulness by the improper handling or bending of tubing, such as would cause the same to be wasted or rejected as scrap.

The apparatus of the present invention is particularly advantageous in the simultaneous bending of a plurality of long lengths of tubing. Also, the apparatus is particularly advantageous in that although the tubing may be bent, for example, through 180° at each bend, neither the formed coil nor the long length of tubing to be fashioned is bodily shifted or swung through the degree of bend.

Other objects of the invention involve an apparatus by which a plurality of lengths of tubing may be placed in or loaded into the machine, articulated mechanism for maintaining the proper tension on the work pieces as they are bent, and yet which involves movement to loosen the engagement and tension, so that the formed portions may be easily removed from the machine and unformed portions loaded into the machine. In the making of a bend, through a given number of degrees, it is to be appreciated that an overbending action is necessary in order to accommodate for the elasticity of the metal and take care of the spring-back characteristic. The apparatus, accordingly, involves devices for overbending the metal so that when the metal of the work pieces springs back to a normal position, following a bending action, the resultant bend is through the desired angle.

The apparatus of the present invention is horizontally disposed and the axes of the bending arbors are horizontally disposed and the machine is quite lengthy in a horizontal direction, especially where a coil is made which has a dimension, for example, approximating three feet or more from the center of one bend to the center of the opposite bend. The invention has as an object, the provision of automatically acting means, for performing certain operations to the end that the operator need not frequently traverse a path from one end of the machine to the other, thus facilitating the operation of the machine, making it easily operable, and accelerating the overall operation.

Other objects will be appreciated as the following detailed description is considered in connection with the accompanying drawings.

One form of apparatus is shown in the accompanying drawings:

Fig. 1a is a diagrammatic view illustrating two bends made in the tubing.

Fig. 1b is a diagrammatic view illustrating how the work is re-inserted in the machine after the two bends shown in Fig. 1a have been made.

Fig. 2 is an enlarged view illustrating the swinging arm and some of the control mechanism.

Fig. 3 is a plan view substantially of the mechanism shown in Fig. 2.

Fig. 4 is a detailed view illustrating a controlling flexible element.

Fig. 17 is a view partly in section and illustrating the mechanism for applying power to make the bends.

Fig. 18 is an enlarged sectional view taken substantially on line 18—18 of Fig. 1 showing a clamp.

Fig. 19 is an enlarged sectional view taken substantially on line 19—19 of Fig. 1 illustrating a stop actuating mechanism.

Fig. 20 is a view of a modified form of the machine illustrating additional mechanism for making an additional bend.

Fig. 21 is a detailed view partly in section showing the power mechanism for making the additional bend.

Fig. 22 is a schematic view illustrating three bends simultaneously made by the form of apparatus shown in Fig. 20.

Fig. 23 is a schematic view illustrating how the form shown in Fig. 22 may be reinserted in the machine for a further bending operation.

Figure 1:
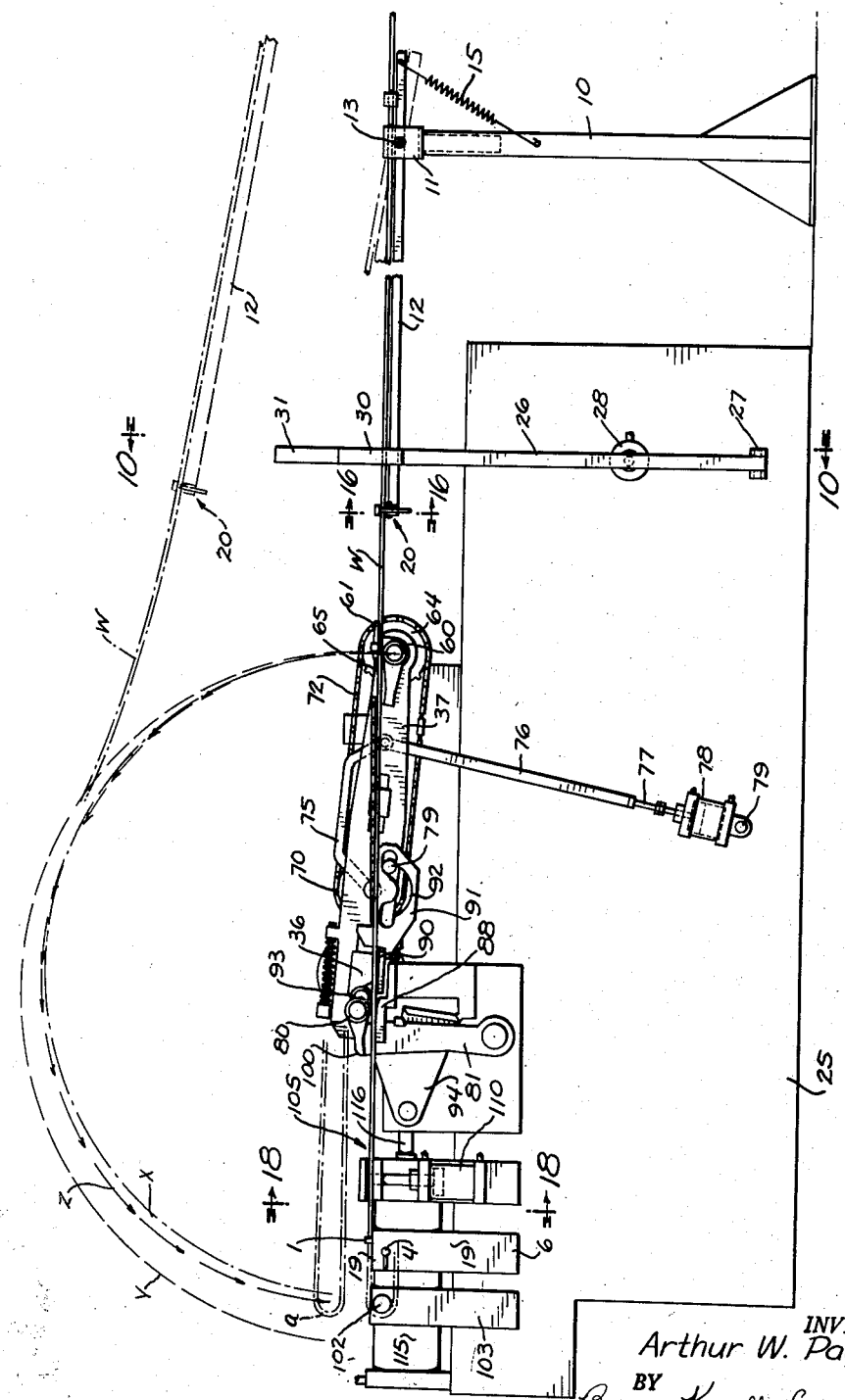
Fig. 1 is a side elevational view of an apparatus constructed in accordance with the invention, illustrating tubing in place with the parts of the machine shown in loading position and with some positions shown in dotted lines.

The apparatus disclosed in the drawings is shown as one for performing bending operations on a plurality of lengths of tubing and the tubing work pieces are shown at $w$. As indicated in Fig. 3, there are six lengths of tubing. Of course, the number of tubes which can be handled by a given machine can be varied and this depends somewhat upon the size of the tubing and the axial dimension of the mandrels and dimensions of other parts. The leading ends of the work pieces may be abutted against a stop 1 and after the leading ends have been properly located the stop may be retracted at the proper time as indicated in Fig. 19. The stop 1 is slidably mounted, as shown, and is acted upon by a pivoted arm 2 spring pressed by a spring 3. An actuating lever 4 has a cam 5 on its shaft. The stop is shown retracted in Fig. 19 and it will be appreciated that by movement of the cam how the stop may be elevated. The stop, of course, is to be adjusted in position which can be done by adjusting the stop carrier 6 from right to left as Fig. 1 is viewed.

Figure 16:
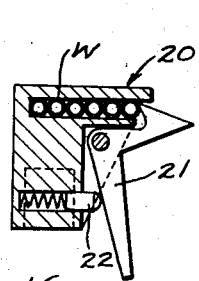
Fig. 16 is a cross sectional view taken on line 16—16 of Fig. 1 showing a holding device for a plurality of tubes.

At some distance from the machine, the work pieces are supported by a post 10 having a head 11 which is swiveled on a vertical axis. The head carries a rather elongated guide arm 12. The guide arm is connected to the head on a horizontal axis as shown at 13. The guide arm 12 is provided with a clip 20 (Fig. 16) which has a holding finger 21 acted upon by a spring pressed plunger 22 to hold the work pieces in the clip. The work pieces may be inserted as the operator actuates the finger to shift it to open the end of the clip recess. The opposite end of the guide arm is connected to a spring 15 which, in turn, is connected to the post 10. This spring has a downward component so as to counter-balance the long arm 12 and it also has a horizontal component so as to tend to swing the long part of the arm 12 toward the machine, as will be more readily appreciated as the description progresses.

Figure 10:
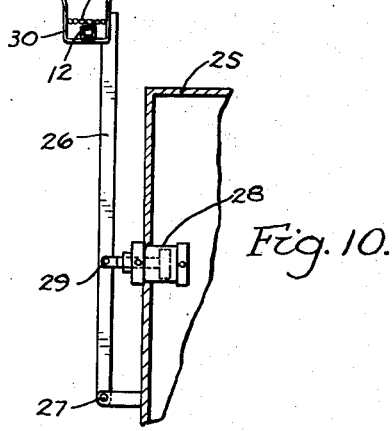
Fig. 10 is a view showing a guide device and loading device taken substantially on line 10—10 of Fig. 1.

The base or frame of the machine is generally illustrated at 25 and there is a loading arm 26 pivotally mounted thereto as at 27. This loading arm (Fig. 10) is arranged to be swung on its pivot as by means of a piston in a cylinder 28, the piston rod of which connects to the loading arm as at 29. The loading arm has a channel 30 in which the guide arm 12 is received, as well as the work tubes, and one side of this channel extends upwardly and outwardly as at 31 for guiding purposes which will presently be seen. As the loading arm 26 is swung on a pivot 27, the guide arm 12 may shift therewith on the vertical axis of the head 11. The spring 15 tends to urge the portion of the arm 12 which lies in the channel 30 toward the right, as Fig. 10 is viewed, and into proper alignment for operation of the machine.

There is a two piece swinging arm for carrying one of the mandrels as indicated in Figs. 2 and 3. One portion of the arm 35 is pivotally mounted on an axis as at 36. The other portion 37 is slidable on the portion 35 as indicated by a slidable connection 38. The portion 35 has reaction abutments 40 and 41 for coil springs 42 and 43 which act upon abutments 44 and 45 to normally place a spring load on the arm portion 37 tending to shift it outwardly away from the center of rotation or axis 36. A flexible element, such as a suitable chain 50, has one end adjustably secured as at 51 to a frame portion 52 of the machine and the other end is anchored as at 53 to the portion 37 of the swinging arm. The chain 50 thus resists the springs 42 and 43 and may pull the arm portion 37 inwardly if the effective length of the chain is shortened. There is a fixed member 55 adjacent the anchored end of the spring (Figs. 3 and 4) upon which the chain is wrapped in the operation of the machine.

The free end of the arm is provided with an arbor 60. This arbor is carried by a bending pad 65 which is fixedly secured to the arm portion 37. Mounted for pivotal action concentrically with the arbor is a bending shoe or pad 61 which has a hub portion 62 which is secured to a hub element 63 on the opposite side of the arm, and to which a sprocket 64 is connected. The shoe 61 has an extending finger 66 which aids in guiding the work into loaded position.

There is another sprocket 70 journalled on the arm portion 37 as at 71, the mounting therefor extending through a slot 72 in the arm portion 35, and a flexible element, such as a chain 72 passes over the two sprockets. This chain can be tightened by suitable turnbuckle arrangements 73. The movement of the sprocket 70 on its axis is controlled by means of an arm 75 rigidly connected to the sprocket 70 and pivotally connected to an arm 76 which is connected to the rod 77 of a piston in a cylinder 78. Movement of the piston in the cylinder 78 is capable of rocking the sprocket 70 slightly and, therefore, the sprocket 64. The cylinder 78 is pivotally mounted as at 79. The peculiar shape of the arm 75 is due to the necessity of providing operating clearances for the parts. The portion 37 of the arm carries a cam follower in the form of a roller 79.

Figure 9:
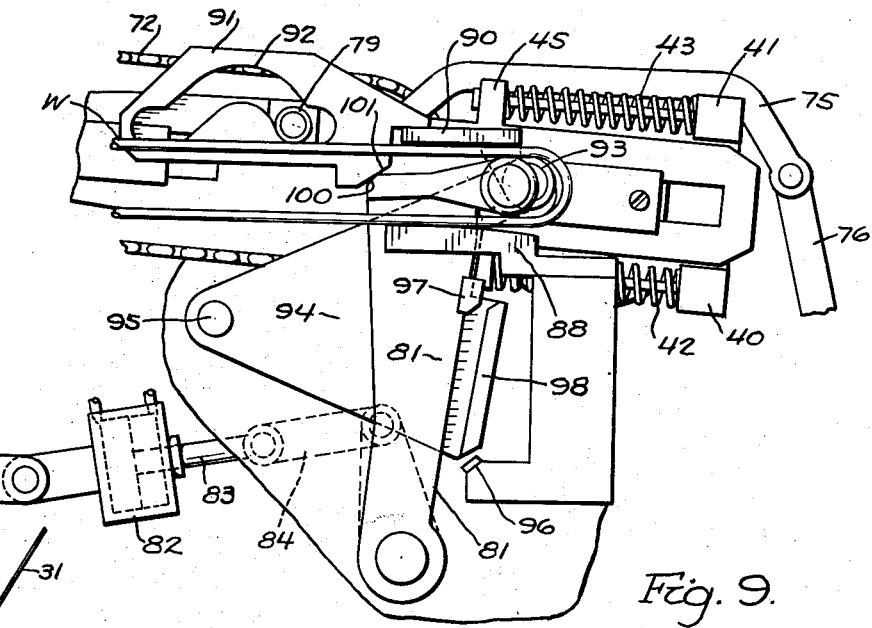
Fig. 9 is a view similar to Fig. 8 showing the parts after the relatively fixed arbor has been shifted to release the tubing following a bending operation.

Another arbor 80, which may be termed the relatively fixed arbor, is carried by a pivoted arm 81 operable by a piston in a cylinder 82, the piston rod 83 of which is connected to the arm 81 by linkage 84 (Fig. 9). By introducing hydraulic medium into the cylinder 82 the relatively fixed arbor may be shifted to and from operating open positions. Adjacent the arbor 80 is a fixed bending pad 88. Also, there is a bending shoe or pad 90. This bending shoe 90 is integrally connected to a cam plate 91 (Fig. 5) having a closed cam groove 92 in which the cam roller 79 functions. The bending shoe 90 is pivotally connected as at 93 to a plate 94 pivotally mounted as at 95. The plate 94 has a part 98 arranged to engage a fixed abutment 96 and arranged to be engaged by a camlike element 97 on the arbor arm 81. The arbor arm 81 has an inclined surface 100 arranged to cooperate with an inclined surface 101 on the cam plate 91.

There is an arborlike post 102 in a position adjacent the stop 1 and the position of this post is adjustable by means of adjusting its support 103. There is also a clamp generally illustrated at 105, and shown particularly in Fig. 18, residing in a fixed member 106 and a movable member 107 mounted on the rod 108 of a piston in a cylinder 110. The faces of the clamp elements 106 and 107 are preferably of yieldable material, such as rubber as shown at 111. This is for the purpose of clamping the work.

The machine is preferably hydraulically operated and the main power cylinder and drive is illustrated in Fig. 17. The cylinder 115 has a piston with a piston rod 116 attached to a gear rack 117 which engages a gear 118 on the axis member 36 of the swinging arm. Decelerating valves 120 and 121 have actuating elements 120a and 121a engageable by inclined surfaces 122 and 123 on the rack bar 117 and electrical limit switches 125 and 126 have actuating elements 125a and 126a to be engaged by the adjustable abutments 128 and 129. These electrical switches are arranged to close valves for the hydraulic medium (not shown).

Figure 5:
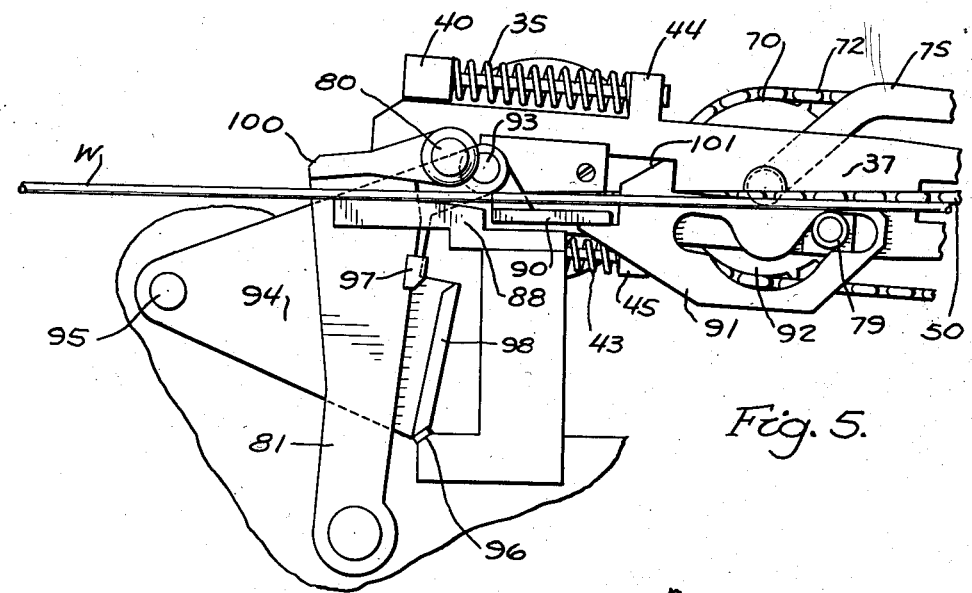
Fig. 5 is an enlarged view showing some of the mechanism including the relatively fixed arbor and showing the tubing in place with the parts in loading position.
Figure 11:
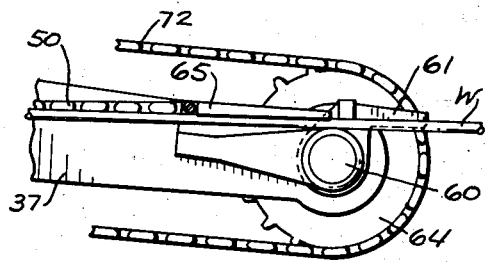
Fig. 11 is a view showing the arbor on the swinging end of the swinging arm with the tubing in position.

In the operation of the apparatus the several tubes are pulled from right to left, as Fig. 1 is viewed, and their leading ends abutted against the stop 1. The tubes are placed in the clip 20 of the loading bar 26. The tubes are passed laterally which would be in an upward direction, as Fig. 3 is viewed, over the arbor 60 guided by and under the overhanging finger 66, under the bending pads 61 and 65; the tubes are passed laterally under the arbor 80 and over the bending shoes or pads 88 and 90. The loading of the tubes with the lateral movement, in which they are placed over the arbor 60, is done, in part, by the swinging of the loading arm 26. The loading arm 26 swings counterclockwise from the view shown in Fig. 10 into a position of disalignment with the arbor 60, and then, when it swings back clockwise to the position shown, the several tubes are properly inserted between the arbor 60 and the bending shoe 61. This function will be brought out more clearly in the actuation between bending cycles. At this time the parts are in the position shown in full lines of Fig. 1. The guide arm 12 lies in the channel of the loading arm 26, as shown in Fig. 10, and the loading arm thus holds the guide arm 12 and the tubes in accurate alignment with the arbors of the machine. During this loading action the machine is in what may be called open position. In other words, the bending shoe 61 is in relatively raised position, as shown in Fig. 11, so that the tubing may be moved in underneath the same. The relatively fixed arbor 80 is retracted to the left as shown in Fig. 5 to provide clearance for the entrance of the tubing under the same and over the bending pads 88 and 90 and the clamp 105 is open. Of course, suitable control valves are employed to control the hydraulic system but this arrangement is not shown.

Figure 12:
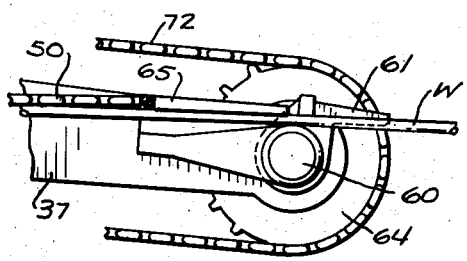
Fig. 12 is a view similar to Fig. 11 showing the bending shoe in pre-set position.

In the cycle of the operation the first thing that takes place is that of setting the machine or closing it, so to speak, for the bending operation. Hydraulic medium (hereinafter for convenience called "oil") is introduced into the cylinder 78 so that the arm 75 is pulled downwardly as Fig. 1 is viewed, the sprocket 70 is rocked clockwise and sprocket 64 rocked clockwise. This shifts the bending pad 61 from the open position shown in Fig. 11 to the pre-set or closed position shown in Fig. 12 wherein it engages the tubes and slightly flexes them. Substantially simultaneously oil is introduced into the cylinder 110 to clamp the work. Substantially simultaneously oil is introduced into the cylinder 83 and the arbor 80 is thereby rocked clockwise from the open position shown in Fig. 5 to the closed position shown in Fig. 6. The arbor 80 thus engages the work and clamps the same against the fixed bending pad 88. At the same time, the cam 97 engages the portion 98 of arm 94 and thus urges it against the fixed element 96 to thus lock the pivotal connection 93 in position. The arbor 80 moves into a concentric relationship with the pivotal connection 93 so that the axis of the bending pad 90 and the axis of the arbor 80 are in alignment. This axis coincides with the axis of the element 55 upon which the chain 50 is wrapped.

With the machine thus set for operation, oil under pressure is introduced into the cylinder 115 to shift the rack bar 17 to the right thus rocking the swinging arm on its axis 36. The arm swings substantially 180° through the arc as illustrated in Fig. 1. It will be noted that the axis of the swinging arm as at 36, is displaced from the aligned axes of the arbor 80, the bending shoe pivot 93 and the axis of the fixed chain wrapping device 55.

Figures 6, 7:
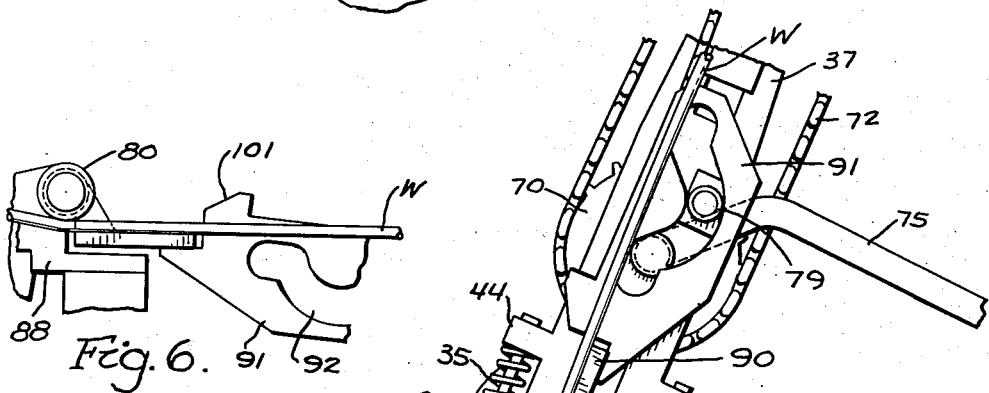
Fig. 6 is a view showing the relatively fixed arbor after it has moved to operating position and also showing a bending shoe.
Fig. 7 is a view similar to Fig. 5 showing the relationship of the parts at the relatively fixed arbor during a bending operation.

As the arm swings through the arc there is a takeup of tubing due to the amount of tube consumed in wrapping around arbor 80. As indicated in Fig. 1, the arcuate line $x$ denotes a true arc which would be described by the axis of the arbor 60 when moved about the axis 36 of the swinging arm, assuming that the distance between the axis 36 and the axis of the arbor 60 remained unchanged. The arc indicated at $y$ is a true arc on a fixed radius about the axis of the arbor 80 while the arbor 80 is in operating position, as shown in Figs. 6 and 7. The arcuate path indicated at $z$ is a form of involute actually traversed by the axis of the arbor 60 as it is pulled inwardly during the swinging of the arm by reason of the chain 50 wrapping around the element 55. The arm swings on its axis 36 through substantially 180° from the position indicated in Fig. 1 and in Fig. 2 to a position indicated in Fig. 8.

Figure 13:
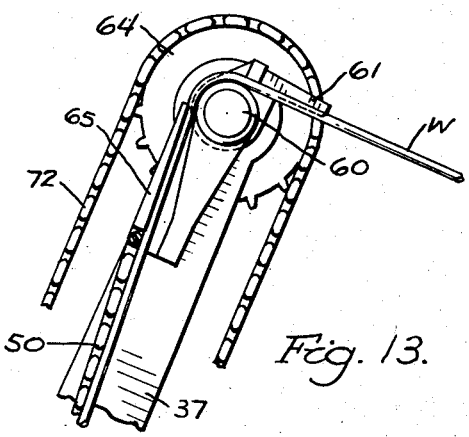
Fig. 13 is a view similar to Fig. 12, corresponding generally to the position shown in Fig. 7, and illustrating parts during a bending operation.
Figure 14:
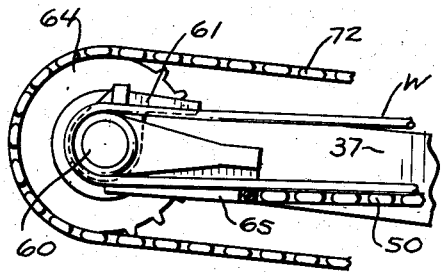
Fig. 14 is a view of the parts shown in Figs. 11 to 13 inclusive and showing the completion of a bending operation.

One important feature of the invention is that the tubing to be bent is not clamped except at its leading end by the clamp 105. As the arm begins to swing, the arbor 60 moves in its involute and the oncoming supply of tube with the guide arm 12 moves upwardly as indicated by the dotted lines in Fig. 1 and shifts out of the channel of the loading arm. The guide bar 12 swings on the axis 13. The arm 75 and its rod 76 holds the sprocket 70 fixed with reference to the base of the machine; that is to say, the sprocket 70 is held against rotation on its axis. This likewise holds the sprocket 64 against rotation of its axis. But sprocket 64 moves through 180° around the axis 36 of the swinging arm. Accordingly, the shoe 61 is caused to move about the arbor 60, as indicated in Fig. 13. The pad or shoe 61 thus fashions the tubing about the arbor as indicated in Fig. 13. Now there is a take up of tube, considering the amount required to bend around the arbor 60, but this excess of tube is supplied by the free unclamped tubing slidably held in the clip 20. At the completion of the stroke, that is, at about 180° movement of the swinging arm, the parts at the arbor 60 and bending pad 61 appear as indicated in Fig. 14. It will be noted that the pre-set position of the shoe 61 overbends the work pieces about the arbor 60. In other words, the tubing is fashioned around the arbor 60 slightly in excess of 180°. This excess is calculated to be whatever is necessary to accommodate for the natural elasticity and spring back tendency so that when the bending pad 61 is released an accurate 180° bend is attained.

Reverting now to the functions at the arbor 80; as the swinging arms moves it arrives at a position indicated in Fig. 7 which corresponds generally to that shown in Fig. 13 and it will be noted that the tubing is being fashioned about the arbor 80. A certain amount of tube is consumed in the bend about the arbor 80 and, therefore, there must be a change made from the original center to center distance between the arbors. This is accomplished by the chain 50 which wraps about the element 55 which is concentric with the arbor 80 and draws the arbor 60 inwardly against the action of the springs 42 and 43. This take up by the chain substantially corresponds to the take up in the tubing although the tubing does not do the actual work of effecting the take up since the tubing is not clamped in position other than the clamp to hold the leading ends in a fixed position. The arrangement is preferably such that a slight tension is maintained on the tubing and the arbor 60 actually traverses a form of involute as shown at z which lies within the path of the true arc y around the center of the arbor 80. As the arm moves, the roller 79 thereon, which is positioned in the cam groove 92, swings the cam and shoe 90, which are integrally joined, about its axis 93 and thus the shoe or bending pad 90 fashions the tube about the arbor 80. It will be remembered that the axis 93 is locked in position by the cam element 97 and abutment 96. The cam groove 92 is shaped so as to cause the bending pad or shoe 90 to move about the arbor 80 substantially at the same rate of angular motion as that of the bending pad 61 about the arbor 60. In other words, the bending pads 90 and 61 are substantially synchronized in their movements about their respective arbors.

Figure 8:
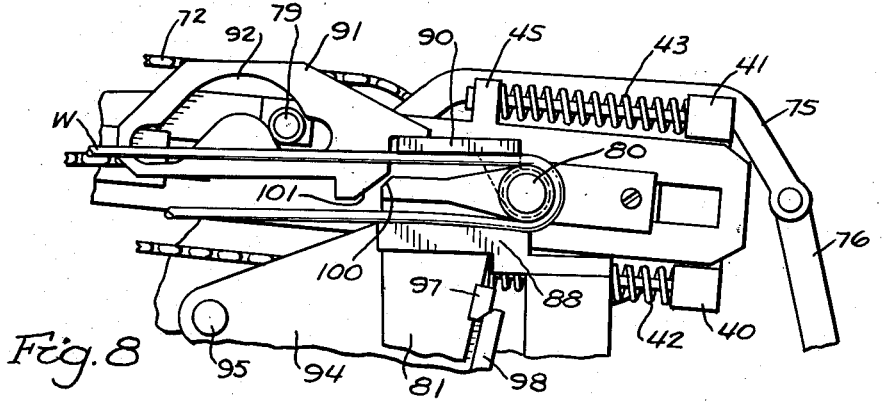
Fig. 8 is a view similar to Figs. 5 and 7 showing the completion of a bending operation.

At the end of the movement, the parts adjacent the arbor 80 have a position as shown in Fig. 8. The shape of the cam groove 92 is such that the bending shoe 90 is caused to overbend the tubing slightly around the arbor 80 as shown in Fig. 8. Also, it will be noted that the fixed shoe 88 effects an over-bend in the tubing about the arbor 80 and this comes about by reason of the movement of the arbor 80 from its open position shown in Fig. 5 to its closed position shown in Fig. 6. At this time the tubing is in the dotted line position shown in Fig. 1, and as diagrammatically indicated in Fig. 1a. Two bends have been made in the stock, namely, the bend a around arbor 60 and the bend b around the arbor 80. The machine, as shown herein, and the operation thereof, is for making bends through 180°. This produces a coil of serpentine form with the runs of tubing parallel to each other. However, there may be considerable variation in the degree of bending as the tubing may be bent through more or less than 180° in which case the swinging arm may be swung through more or less than 180°. This, for example, may be attained by adjusting the position of the limit switches 125 and 126 and their actuating abutments 128 and 129.

The tubing must now be removed from the machine and it will be appreciated that it is tightly engaged therein at this time. So, the next procedure in the cycle is to open the machine, so to speak. Oil is introduced into the opposite end of the cylinder 82 to retract the arbor from the Fig. 8 position to the Fig. 9 position. The Fig. 9 position is the same as the starting position shown in Fig. 5. This retracts the arbor arm 81 and it thereby releases the bending pad arm 94 from its position locked between the cam 97 and the abutment 96. As the arm 81 retracts, the portion 100 strikes the inclined face 101 on the cam element 91 and elevates it. This elevates the articulated connection 93 between the bending shoe 90 and the bending shoe lever 94 so that the bending shoe 90 is elevated and the pressure on the tubing is relieved. Substantially simultaneously, oil is introduced into the opposite end of the cylinder 78 to rock the sprocket 70 and the sprocket 64 counter-clockwise and thus the bending pad 61 is shifted from the Fig. 14 position to the Fig. 15 position and the pressure on the tubing is relieved. The clamp 105 is also released by introducing oil into cylinder 110 and oil is introduced into the cylinder 28 of the loading arm 26 to shift the loading arm 26 counter-clockwise a limited distance from the position shown in Fig. 10.

Figure 15:
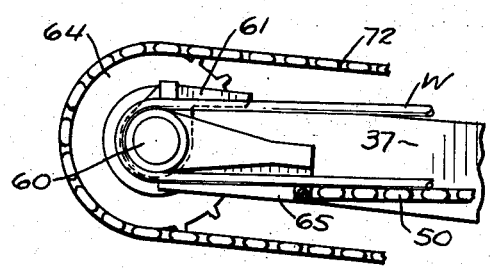
Fig. 15 is a view similar to Fig. 14 showing the bending shoe released.

The operator, who may now be standing near the arbor 80, grasps the formed tubing and pulls the same laterally thus removing the formed tubing from the arbor 80 and the arbor 60, whose positions are as indicated in Fig. 9 and in Fig. 15. The portions of the tubing in the channel of the loading arm 26 are shifted laterally to the left, as Fig. 10 is viewed, by movement of the loading arm, so that all tubing is now disaligned from the machine. Oil is now introduced into the opposite end of the cylinder 15 and the rack 117 is shifted to the left and thus the swinging arm is shifted back to the position shown in Fig. 1.

At this time, the operator who may remain standing in about the same position, adjacent the arbor 80, places the formed tubing in a position as shown in Fig. 1b. In doing this, the formed coil portion is lowered and the bend a is placed over the post 102. The operator pushes the several tubes back into position between the arbor 80 and the bending pads, as shown in Fig. 5, and the loading arm 26 shifts back to the position shown in Fig. 10, thus moving the work tubes between the arbor 60 and the bending shoe 61, as shown in Fig. 11. Thus the operator may remain standing adjacent the arbor 80 and need not walk lengthwise of the machine to insert the work pieces in proper relationship with the arbor 60.

As the arm swings through its angular movement, the oncoming work is raised as shown in Fig. 1, but it slides forwardly through the clip 20 and the tubes and guide arm 12 move upwardly out of the guiding channel on the loading arm 26. On the reverse movement, however, the tubes and guide arm move back into the channel 30, which action is aided by the angular guide 31. When the arm 26 is shifted counter-clockwise on its pivot 27, the guide arm 12 swings on the vertical axis of the head 11, thus flexing the spring 15. The spring 15 aids in keeping the arm 12 in proper alignment.

This completes one cycle of operation and it now remains to repeat the cycle. In a repeated cycle, it may be reiterated that the bending shoe 61 is pre-set and the arbor 80 is set in position, which action also locks the position of the fulcrum point 93 for the bending shoe 90. In the repeat cycle the stop 1 is not used. It is lowered to inoperative position by manipulation of the handle 4. The engagement of the bend a over the post 102 is adequate to position the tubing. The bending cycles may be repeated as many times as is necessary to produce a serpentine coil of the desired number of runs and bends within the limits of the length of the tubes. If the coil involves an uneven number of bends, the last cycle of operation of the machine will make only one bend. This last bend will be made around the arbor 80, and the trailing end of the tube may lie radially inwardly of the arbor 60, or may be placed above the bending pad 61 so as not to be fashioned around the arbor 60. After the work pieces have been fully bent, the completed serpentine coils are removed and new tubes are placed in the machine with the leading ends against the stop 1. It will be appreciated that the stop 1 is located at a desirable place depending upon the location the end of the tubing is to take in the finished serpentine form.

Inasmuch as a rapid action is desired, and inasmuch as there is a considerable weight in the arm and mechanism mounted thereon, the control valves shown in Fig. 17 may be employed. The introduction of hydraulic medium into the cylinder 115 rapidly accelerates the arm and rapidly rocks it. When the gear rack is moving to the right, the inclined face 123 strikes the movable member 121a of a valve 121 which gradually reduces the flow of oil into the cylinder and thus serves to decelerate the arm so that it is not subjected to shock when it reaches the end of its stroke. Then the abutment 129 strikes the actuator 126a of the limit switch 126 to completely stop the introduction of oil into the cylinder. The same action occurs on the reverse movement in which the incline or cam 122 acts upon the actuator 120a of the decelerating valve 120 and the abutment 128 actuates the arm 125a of the limit switch 125.

In the modified forms shown in Figs. 20, 21 and 22, most of the elements are the same as those previously described and have the same reference characters applied thereto. However, in this case, an additional bending mechanism is applied to the machine. This mechanism is shown as having a frame 140 with a bending shoe 141 and an arbor 142. The bending shoe is pivotally mounted on the axis of the arbor as indicated at 143 and it has a gear 144 operable by a gear rack 145 which is actuated by a piston in a hydraulic cylinder 146. There is also a fixed bending pad 147. The work w is placed in the machine with the leading ends thereof against a suitable stop 150. Limit switches 151 and 152 are actuated by abutments 153 and 154 to control the hydraulic system. After the tube is thus placed, and the machine is set or closed for operation as above described, oil is introduced in the cylinder 146 substantially simultaneously with the introduction of oil into the main cylinder 115 so that as the bending arm swings through its movement, the shoe 141 swings counter-clockwise around the arbor 142 as Fig. 20 is viewed. This is done by movement of the gear rack 145 to the right, as Fig. 21 is viewed, and thus in addition to making the bends a and b around the arbors 60 and 80, a bend c is made around the arbor 142 as shown in Fig. 22. The limit switch 152 cuts off the supply of oil and thus limits the movement of the bending pad 141. On the return stroke of the bending arm, oil is introduced into the cylinder 146 to reversely shift the gear rack 145 thus returning the shoe 141 to the position shown in Fig. 20.

Accordingly, if it is desired to make a coil with only three bends in it, then the machine is capable of making those three bends in a plurality of tubes in a single bending cycle. However, if more bends are desired, the serpentine form with the three bends may be positioned as shown in Fig. 23, and then on the next cycle of operation, three more bends are made as indicated at a', b' and c'. These bending cycles may be continued until the desired number of bends are made.

I claim:

1. An apparatus for bending a work piece of elongated form, such as tube, into a coil of serpentine form having a succession of reverse bends comprising, a supporting frame, a first arbor mounted on the frame, an arm pivotally mounted on the frame with its pivot adjacent said arbor, a second arbor on the arm removed from the pivot thereof, a bending pad pivotally mounted adjacent the first arbor, a bending pad pivotally mounted adjacent the second arbor, the arbors and pads adapted to have a substantially straight work piece positioned between the respective arbors and pads with the work piece extending transversely of the axes of the arbors, means for swinging the arm on its pivot, and means for causing the bending pads to move about their respective arbors as the arm swings to thereby bend the work piece about both arbors.

2. An apparatus for bending a work piece of elongated form, such as tube, into a coil of serpentine form having a succession of reverse bends comprising, a supporting frame, a first arbor mounted on the frame, an arm pivotally mounted on the frame with its pivot adjacent said arbor, a second arbor on the arm removed from the pivot thereof, a bending pad movably mounted adjacent the first arbor, a bending pad movably mounted adjacent the second arbor, the arbors and pads adapted to have a substantially straight work piece positioned between the respective arbors and pads with the work piece extending transversely of the axes of the arbors, means for holding the leading end of the work piece in fixed position, means for swinging the arm on its pivot, and means for causing the bending pads to move about their respective arbors as the arm swings to thereby bend the work piece about both arbors.

3. An apparatus for bending a work piece of elongated form, such as tube, into a coil of serpentine form having a succession of reverse bends comprising, a supporting frame, a first arbor mounted on the frame, an arm pivotally mounted on the frame with its pivot adjacent said arbor, a second arbor on the arm removed from the pivot thereof, a bending pad movably mounted adjacent the first arbor, a bending pad movably mounted adjacent the second arbor, the arbors and pads adapted to have a substantially straight work piece positioned between the respective arbors and pads with the work piece extending transversely of the axes of the arbors, means for holding the leading end of the work piece in fixed position, with the work piece extending away from the second named arbor in a free manner, means for swinging the arm on its pivot and means for causing the bending pads to move about their respective arbors as the arm swings to bend the work piece about both arbors.

4. An apparatus for bending a work piece of elongated form, such as tube, into a coil of serpentine form having a succession of reverse bends comprising, a supporting frame, a first arbor mounted on the frame, an arm pivotally mounted on the frame with its pivot adjacent said arbor, a second arbor on the arm removed from the pivot thereof, a bending pad pivotally mounted adjacent the first arbor, a bending pad pivotally mounted adjacent the second arbor, the arbors and pads adapted to have a substantially straight work piece positioned between the respective arbors and pads with the arbors on opposite sides of the work piece and with the work piece extending transversely of the axes of the arbors, means for holding the leading end of the work piece in fixed position, means for swinging the arm on its pivot, means for causing the bending pads to move about the respective arbors as the arm swings to bend the work piece about both arbors, and means interconnecting the supporting frame and the second arbor for shifting the second arbor radially inwardly of the swinging arm as it swings to an extent which substantially corresponds to the length of the work piece consumed in the wrap of the work piece around the first named arbor.

5. An apparatus for bending a work piece of elongated form, such as tube, into a coil of serpentine form having a succession of reverse bends comprising, a supporting frame, a first arbor mounted on the frame, an arm pivotally mounted on the frame with its pivot adjacent said arbor, a second arbor on the arm removed from the pivot thereof, a bending pad pivotally mounted adjacent the first arbor, a bending pad pivotally mounted adjacent the second arbor, the arbors and pads adapted to have a substantially straight work piece positioned between the respective arbors and pads with the arbors on opposite sides of the work piece and with the work piece extending transversely of the axes of the arbors, means for holding the leading end of the work piece in fixed position, means for swinging the arm on its pivot, means for causing the bending pads to move about the respective arbors as the arm swings to bend the work piece about both arbors, a flexible element connected at one end to the second named arbor, a member having a rounded surface adjacent the first named arbor, means anchoring one end of the flexible element adjacent said member, whereby said flexible element is wrapped upon said member as the arm swings to shift the second named arbor radially inwardly toward the first named arbor as the arm swings.

6. An apparatus for bending a work piece of elongated form, such as tube, into a coil of serpentine form having a succession of reverse bends comprising, a supporting frame, a first arbor mounted on the frame, an arm pivotally mounted on the frame with its pivot adjacent said arbor, a second arbor on the arm removed from the pivot thereof, a bending pad pivotally mounted adjacent the first arbor, a bending pad pivotally mounted adjacent the second arbor, the arbors and pads adapted to have a substantially straight work piece positioned between the respective arbors and pads with the arbors on opposite sides of the work piece and with the work piece extending transversely of the axes of the arbors, means for holding the leading end of the work piece in fixed position, means for swinging the arm on its pivot, means for causing the bending pads to move about the respective arbors as the arm swings to bend the work piece about both arbors, a flexible element connected at one end to the second named arbor, a member having a rounded surface substantially concentric to the first named arbor, means anchoring one end of the flexible element adjacent said member, whereby said flexible element is wrapped upon said member as the arm swings to shift the second named arbor radially inwardly toward the first named arbor as the arm swings.

7. An apparatus for bending a work piece of elongated form, such as tube, into a coil of serpentine form having a succession of reverse bends comprising, a supporting frame, a first arbor mounted on the frame, an arm pivotally mounted on the frame with its pivot adjacent said arbor, a second arbor on the arm removed from the pivot thereof, a bending pad pivotally mounted adjacent the first arbor, a bending pad pivotally mounted adjacent the second arbor, the arbors and pads adapted to have a substantially straight work piece positioned between the respective arbors and pads with the work piece extending transversely of the axes of the arbors, means for holding the leading end of the work piece in fixed position, spring means for yieldably urging the second arbor radially outwardly from the pivot of said arm, means for swinging the arm on its pivot, means for causing the bending pads to move about their respective arbors as the arm swings to bend the work piece about the two arbors, a flexible element connected to the second arbor, means anchoring the flexible element adjacent the first arbor, and a member having a rounded surface adjacent the first arbor upon which the flexible element is wrapped as the arm swings, whereby to shift the second arbor radially inwardly as the arm swings to an extent substantially corresponding to that required by the shortening of the work piece because of the wrap of the work piece about the first arbor.

8. The apparatus substantially as described in claim 1, characterized in that there is a movably mounted supporting means for the first arbor, and means for shifting the supporting means to shift the first arbor into working position for bending and out of working position to relieve the work piece for removal of the work piece from the arbors.

9. The apparatus substantially as described in claim 1, characterized in that there is a movably mounted supporting means for the first arbor, and means for shifting the supporting means to shift the first arbor into working position for bending and out of working position to relieve the work piece for removal of the work piece from the arbors, and further characterized by a movable element upon which the bending pad for the first arbor is fulcrumed, interengaging means between said supporting means and the movable element for locking the movable element in working position when the supporting means is in working position, and interengaging means between the supporting means and the bending pad for the first arbor for shifting the said bending pad when the supporting means moves out of working position so that the pad releases the work piece for removal of the work piece.

10. The apparatus as substantially described in claim 1, characterized in that there is an interengaging cam and cam follower, one on the bending pad adjacent the first arbor and one on the arm, which causes the bending pad to move about the first arbor as the arm swings.

11. The apparatus as substantially described in claim 1, characterized in that there is an interengaging cam and cam follower, one on the bending pad adjacent the first arbor and one on the arm, which causes the bending pad to move about the first arbor as the arm swings, the cam being so shaped as to cause the bending pad adjacent the first arbor to move about the first arbor at a rate of angular motion substantially the same as the rate of angular motion of the bending pad adjacent the second arbor about the second arbor.

12. The apparatus as substantially described in claim 1, characterized in that there is an interengaging cam and cam follower, one on the bending pad adjacent the first arbor and one on the arm, which causes the bending pad to move about the first arbor as the arm swings, the cam being so shaped as to cause the bending pad adjacent the first arbor to move about the first arbor at a rate of angular motion substantially the same as the rate of angular motion of the bending pad adjacent the second arbor about the second arbor, and the cam being further shaped to cause the bending pad adjacent the first arbor to overbend the work piece about the first arbor to accommodate for the spring back tendency of the work piece.

13. The apparatus as substantially described in claim 1, characterized in that there is an interengaging cam and cam follower, one on the bending pad adjacent the first arbor and one on the arm, which causes the bending pad to move about the first arbor as the arm swings, and further characterized in that the bending pad has a movable fulcrum, and means for shifting the fulcrum to release the bending pad from the work piece after a bend has been made.

14. The apparatus substantially as described in claim 1, characterized in that the first arbor is movable into and out of working position, and that there is means providing a movable fulcrum for the bending pad at said first arbor, interengaging means between the first arbor and the fulcrum providing means operable to lock the movable fulcrum in working position when the arbor shifts to working position, and interengaging means between the arbor and the fulcrum providing means for shifting the fulcrum when the arbor moves out of working position to thereby release the work piece from both the arbor and the bending pad.

15. The apparatus as substantially described in claim 1, characterized in that there is means pivotally mounting the bending pad for the second named arbor on the axis of that arbor, a rockable element mounted on the arm, a flexible element interconnecting the said last named bending pad and the rockable element, and shiftable control means connected to the rockable element and shiftable to rock the same and to rock said bending pad to pre-set said bending pad and for holding the same in position, whereby it moves about said second named arbor as the said arm swings, said control means being operable to reversely rock said element and bending pad to release the pad from the work piece after a bend has been made.

16. The apparatus as substantially described in claim 1, characterized in that there is means rockably mounting the bending pad adjacent the second named arbor, a sprocket connected to said means, a second sprocket mounted on the arm, a chain operating over the sprockets, and control means connected to the second sprocket operable to rock the second sprocket and thereby rock the last named bending pad to a pre-set position engaging the work piece, said control means being operable to hold the second sprocket against turning on its axis, to thereby cause the said last named bending pad to shift about the second named arbor as the arm moves on its pivot, and operable to rock the second sprocket and thereby rock the said bending pad in reverse direction to cause the bending pad to release the work piece after a bend has been made.

17. An apparatus as substantially described in claim 1, characterized in that there is a movable means upon which the first named arbor is mounted, and means for shifting the said means to shift the first named arbor into and out of working position, and a fixed bending pad adjacent the first named arbor positioned so that the work piece is engaged thereby when the first named arbor shifts to working position to overbend the work piece on the arbor.

18. An apparatus for bending a work piece of elongated form, such as tube, into a coil of serpentine form having a succession of reverse bends comprising, a supporting frame, a first arbor movably mounted on the frame to and from working position, a bending pad having a movable fulcrum and positioned adjacent the first arbor, a pivotally mounted arm, a second arbor on the arm, means yieldably urging the second arbor radially outward of the arm, a flexible element restraining outward movement of the second arbor, a bending pad pivotally mounted on the axis of the second arbor, the arbors and their respective pads adapted to receive a work piece therebetween with the arbors on opposite sides of the work piece, means for shifting the first arbor into working position and for locking the fulcrum of the first named bending pad on the axis of the first named arbor when in working position, control means for rocking the second named bending pad into pre-set position, means for swinging the arm on its pivot and for causing the bending pads to shift about their respective arbors while the arm is swung to bend the work piece about both arbors, an element having a curved surface concentric with the working position of the first named arbor upon which the flexible element is wrapped as the arm swings to shift the second named arbor radially inwardly to accommodate for take up of the work piece as it is wrapped about the first named arbor, means for shifting the movable fulcrum for the first named pad as the first named arbor shifts out of working position to thereby release the work piece from the first named arbor and its pad, said control means being shiftable to relieve the second named pad from its pre-set position to release the work piece from the second named arbor and its pad whereby the bent work piece may be withdrawn from the arbors.

19. An apparatus for bending a work piece of elongated form, such as tube, into a coil of serpentine form having a succession of reverse bends comprising, a relatively fixed arbor, a swinging arm having an arbor thereon, a pivotally mounted bending pad adjacent each arbor, the arbors and pads adapted to have a work piece placed between the respective arbors and pads with the arbors on opposite sides of the work piece, a movably mounted loading device having a clip through which the elongated work piece is threaded, means for swinging the arm to cause the pads to move about the arbors to bend the work piece about both arbors, means for shifting one arbor and the bending pads to relieve the work piece so that the formed coil portion may be shifted axially off the arbors, means for shifting the loading device to position the elongated part of the work piece out of alignment with the arbors, said last named means being operable to shift the loading device to move the elongated work piece into alignment with the arbors with the work piece moving between the second named arbor and its bending pad.

20. An apparatus for bending a work piece of elongated form, such as tube, into a coil of serpentine form having a succession of reverse bends comprising, a relatively fixed arbor, a swinging arm having an arbor thereon, a bending pad adjacent and movable about each arbor, the arbors and pads adapted to have a work piece placed between the respective arbors and pads with the arbors on opposite sides of the work piece, means for swinging the arm to cause the pads to move about the arbors to bend the work piece about both arbors, means for shifting the relatively fixed arbor and for shifting both bending pads after the work piece has been bent to thereby relieve the work piece of tight engagement with the arbors and pads so that the formed coil portion may be removed from the arbors.

21. An apparatus for bending a work piece of elongated form, such as tube, into a coil of serpentine form having a succession of reverse bends comprising, a relatively fixed arbor, a swinging arm having an arbor thereon, a bending pad adjacent and movable about each arbor; the arbors and pads adapted to have a work piece placed between the respective arbors and pads with the arbors on opposite sides of the work piece, means for swinging the arm to cause the pads to move about the arbors to bend the work piece about both arbors, means for shifting the relatively fixed arbor and for shifting both bending pads after the work piece has been bent to thereby relieve the work piece of tight engagement with the arbors and pads, so that the formed coil portion may be removed from the arbors, means for swinging the arm back to its initial position whereby the work piece may be reinserted between the arbors and pads for a subsequent bending operation, and a laterally shiftable loading device for slidably engaging the elongated work piece for shifting the work piece laterally for movement of the arm and its arbor back to said initial position and for laterally shifting the work piece to reinsert the same between the arbor and pad on said arm.

22. An apparatus for bending a work piece of elongated form, such as tube, into a coil of serpentine form having a succession of reverse bends comprising, a first arbor, a pivotally mounted arm with its pivot adjacent the first arbor, a second arbor on the arm removed from the pivot thereof, bending pads adjacent the two arbors and movable about the same, a relatively fixed third arbor positioned on the side of the first arbor opposite that of the second arbor, a bending pad adjacent the third arbor, the arbors and their respective pads adapted to have a substantially straight work piece positioned between the respective arbors and pads, means for swinging the arm on its pivot and for causing the bending pads adjacent the first and second named arbors to move about their respective arbors to bend the work piece about both the first and second named arbors, and means for causing the bending pad adjacent the third arbor to move about the third arbor to bend the work piece about the third arbor, whereby three bends are made in the work piece.

ARTHUR W. PAYNE.

References Cited in the file of this patent

UNITED STATES PATENTS

| Number | Name | Date |
|---|---|---|
| 1,001,244 | Brown, Jr. | Aug. 22, 1911 |
| 1,124,251 | Anderson | Jan. 12, 1915 |
| 1,125,241 | Wilson | Jan. 19, 1915 |
| 1,695,836 | Witmer | Dec. 18, 1928 |
| 2,474,276 | Payne | June 28, 1949 |